H. F. HAYDEN.
Device for Supplying Air to Furnaces.
No. 198,613. Patented Dec. 25, 1877.
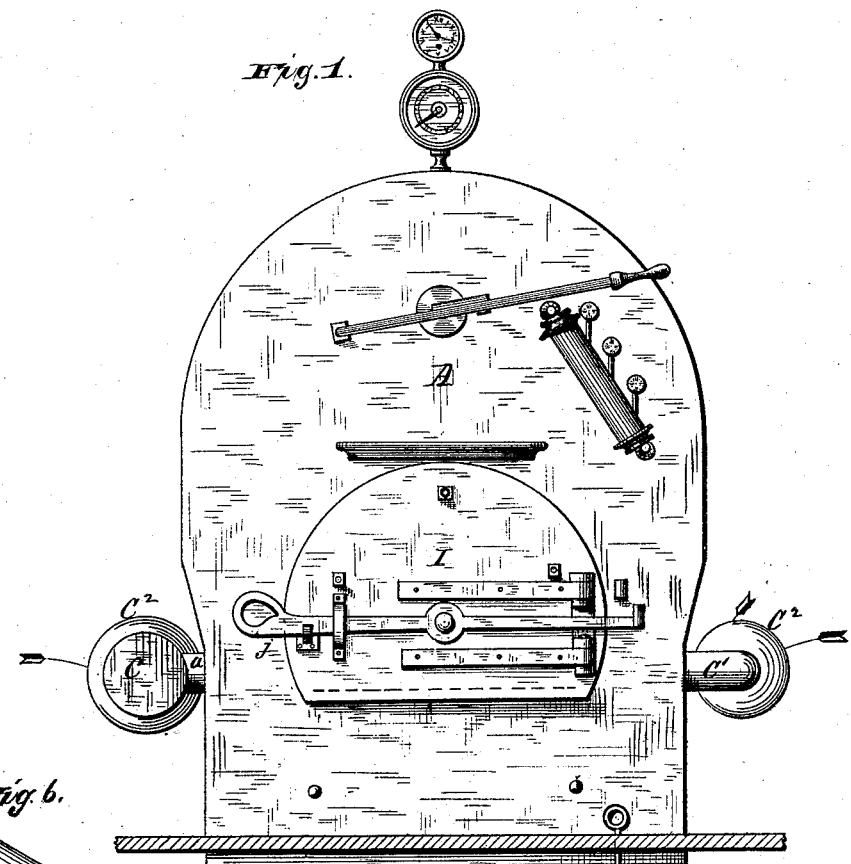
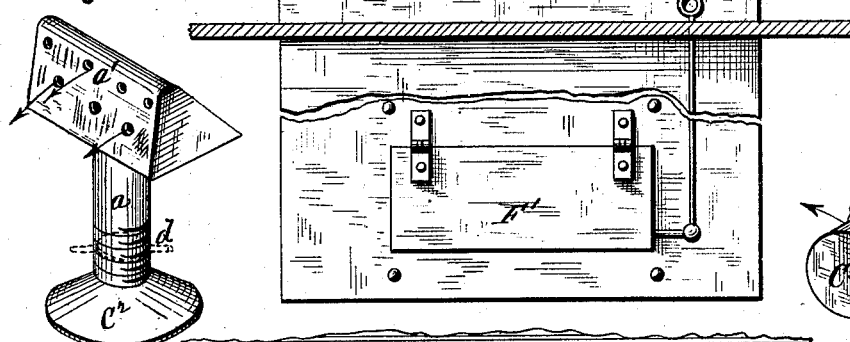
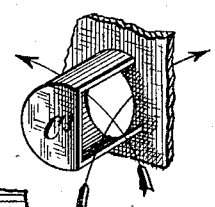
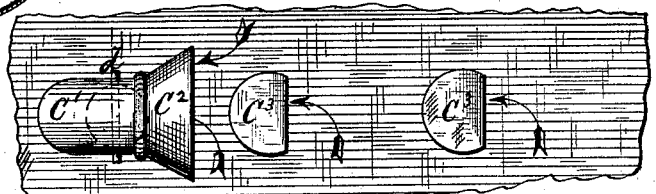

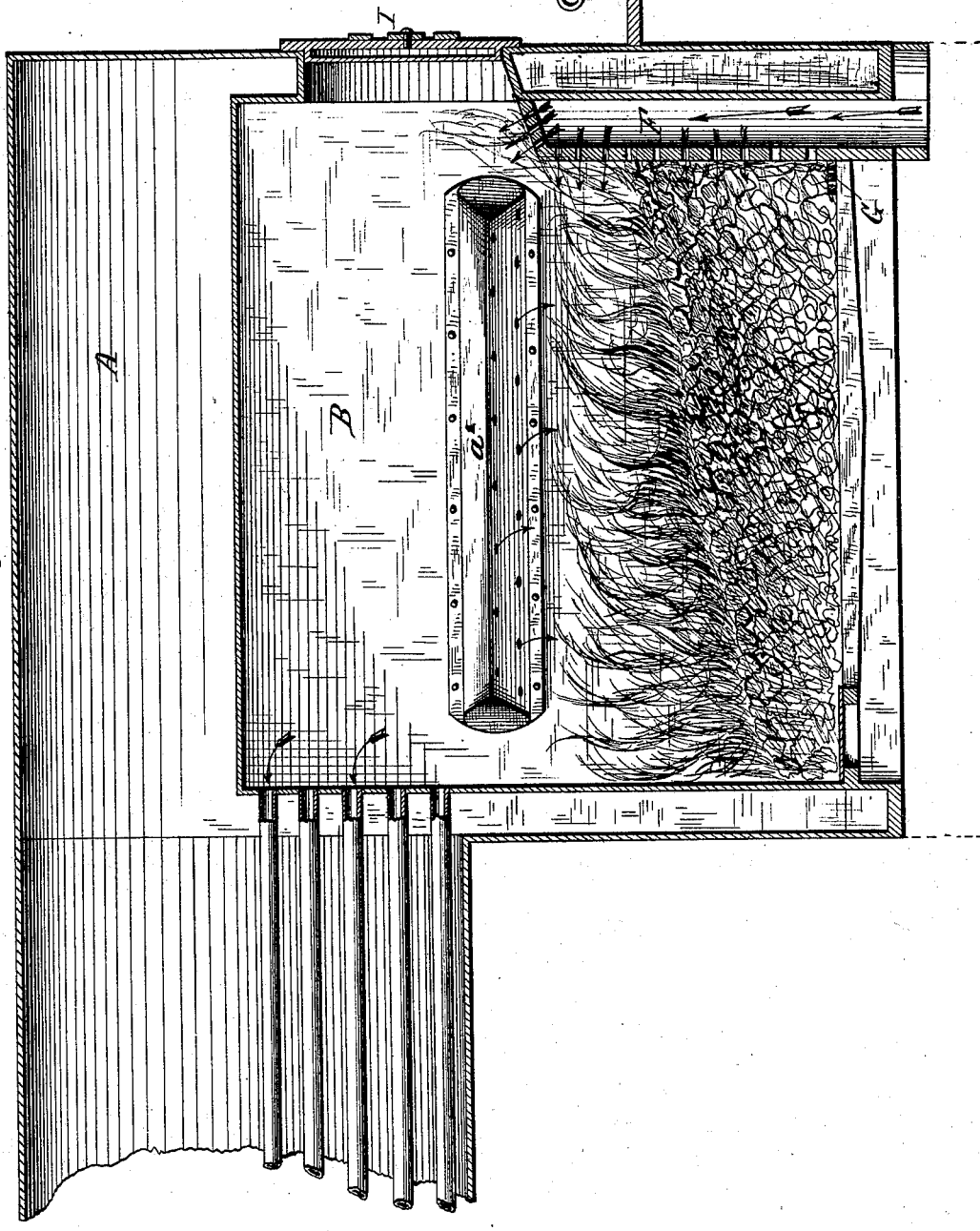

H. F. HAYDEN.
Device for Supplying Air to Furnaces.
No. 198,613. Patented Dec. 25, 1877.
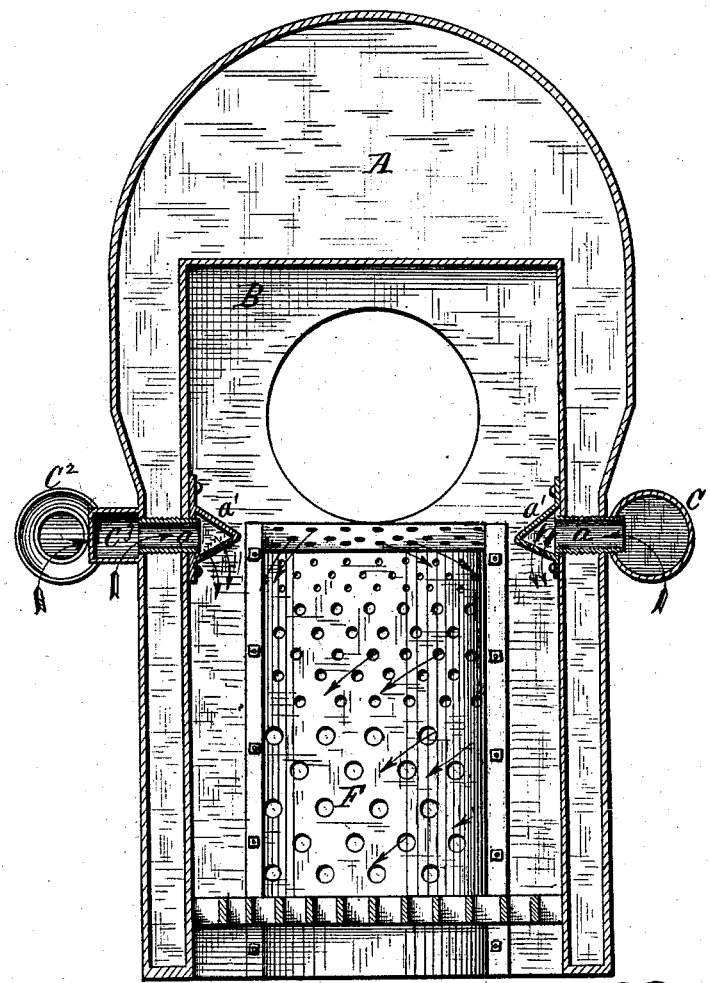
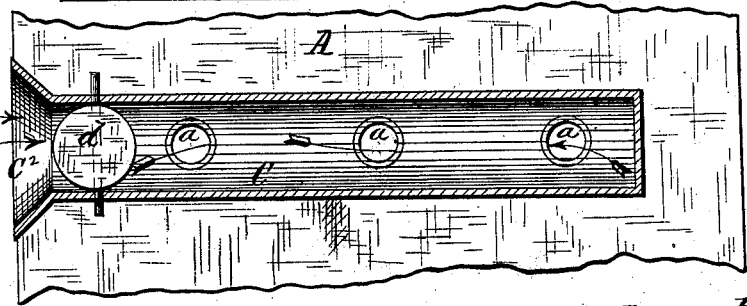

7 Sheets—Sheet 4.

H. F. HAYDEN.
Device for Supplying Air to Furnaces.

No. 198,613. Patented Dec. 25, 1877.

Witnesses.
Alex Mahon
John G. Center

Inventor.
H. F. Hayden

H. F. HAYDEN.
Device for Supplying Air to Furnaces.

No. 198,613. Patented Dec. 25, 1877.

7 Sheets—Sheet 5.

Witnesses.
Aley Mahon
John G. Center.

Inventor:
H. F. Hayden

H. F. HAYDEN.
Device for Supplying Air to Furnaces.
No. 198,613. Patented Dec. 25, 1877.
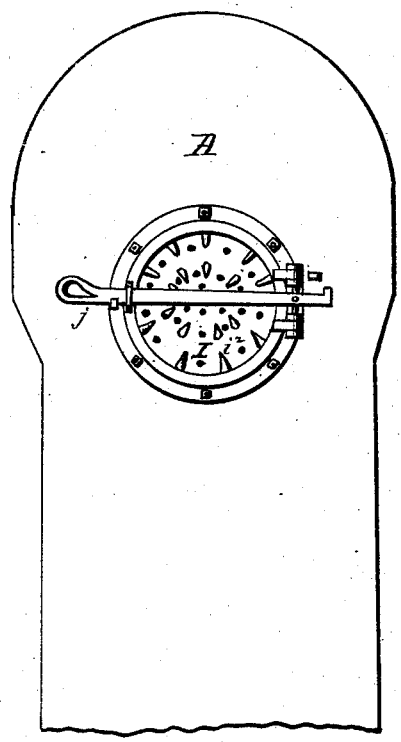
Fig. 13.
Fig. 14.
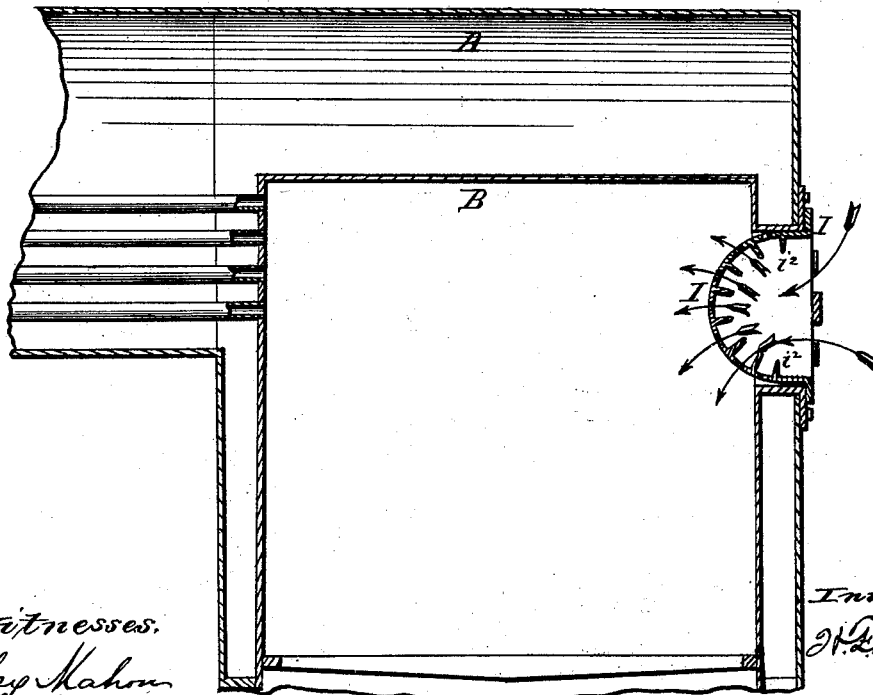

H. F. HAYDEN.
Device for Supplying Air to Furnaces.
No. 198,613. Patented Dec. 25, 1877.

UNITED STATES PATENT OFFICE.

HENRY F. HAYDEN, OF WASHINGTON, DISTRICT OF COLUMBIA.

IMPROVEMENT IN DEVICES FOR SUPPLYING AIR TO FURNACES.

Specification forming part of Letters Patent No. 198,613, dated December 25, 1877; application filed December 8, 1877.

*To all whom it may concern:*

Be it known that I, HENRY F. HAYDEN, of the city and county of Washington, District of Columbia, have invented certain new and useful Improvements in Means for Supplying Air to Locomotive and other Furnaces, of which the following is a full, clear, and exact description, reference being had to the accompanying drawings, making part of this specification, in which—

Figure 8:
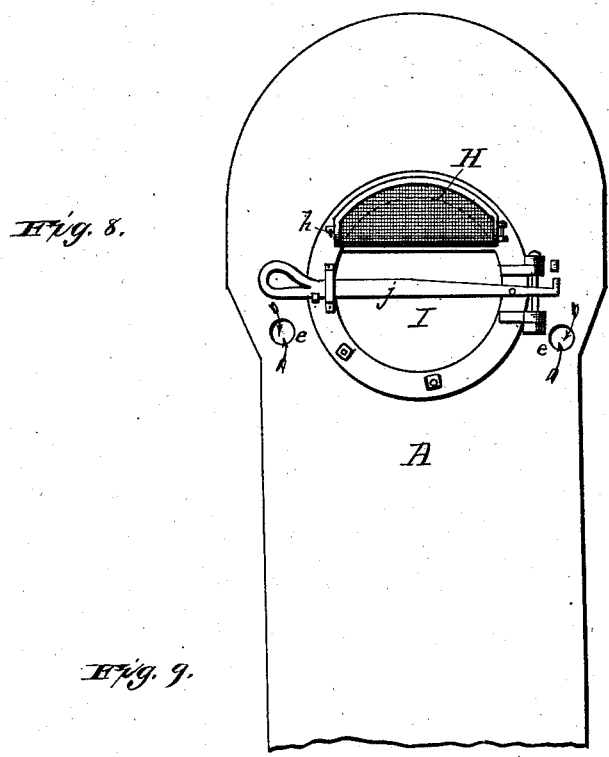
Figure 9:
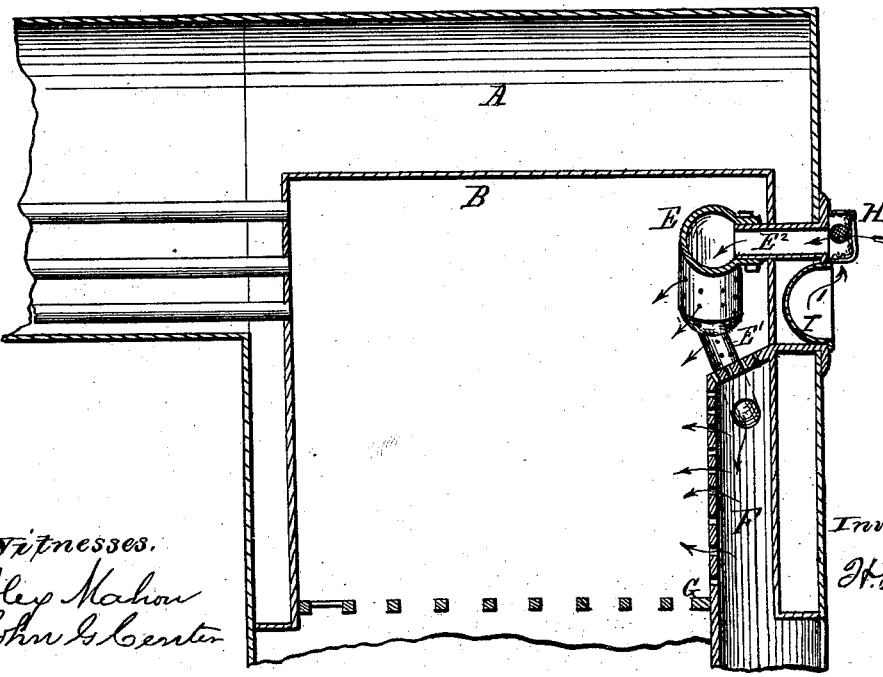
Figure 10:
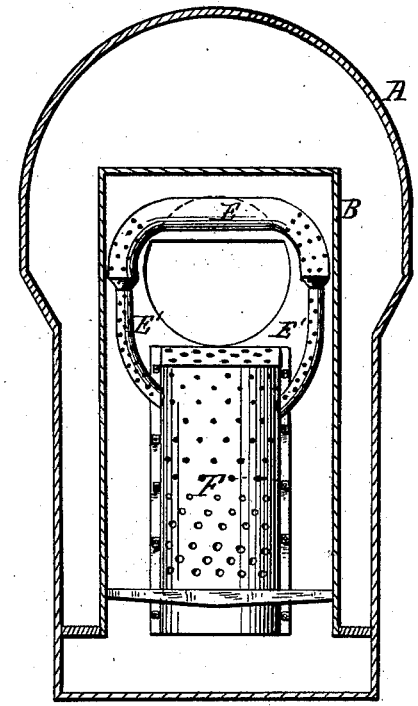
Figure 12:
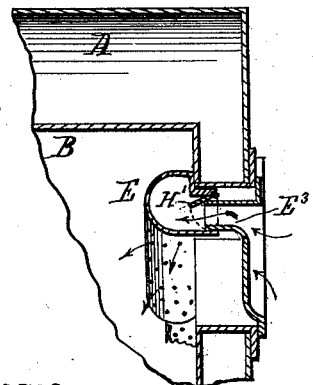
Figure 11:
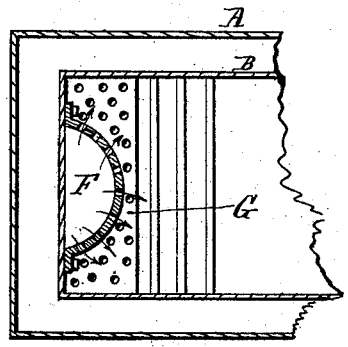

Figure 1 is a front elevation of a boiler and furnace, showing my improvements in part. Fig. 2 is a vertical longitudinal section through the same. Fig. 3 is a transverse section. Figs. 4, 5, 6, and 7 are detail views, hereinafter described. Fig. 8 is a front elevation, showing the hood or protector to the air-duct. Fig. 9 is a longitudinal vertical section through Fig. 8; and Fig. 10 is a vertical transverse section through the same, showing the arrangement of the air ducts and distributers applied upon the inside to the end wall of the fire-pot; and Fig. 11 is a horizontal section through the lower duct and distributer. Fig. 12 shows a modification in the device for protecting the the air-duct; and Figs. 13, 14, 15, and 16 show modifications in the construction of the fire-door.

Similar letters of reference denote corresponding parts in all the figures.

The invention relates to a novel arrangement of means for supplying air to furnaces, and for causing the same, when properly heated, to be distributed therein in such manner as to cause it to thoroughly mingle with the rising gases and cinder, and thereby to promote the combustion of the same, as hereinafter described.

The devices through which these results are obtained will be best understood from the following description, with reference to the drawings, in which—

A represents the outer shell or boiler, and B the fire-pot, placed within said shell, and surrounded on its sides, ends, and top by the usual water spaces or jacket.

The relation of the fire-pot and boiler-shell at points above the connecting bottom plate is maintained by stay-bolts, which, in the present instance, are enlarged and made hollow, or in the form of short tubes $a\ a$. (See Figs. 3 and 4.) The inner ends of these stay-bolts are provided with V-shaped distributers $a'$, either made short, and one applied to each hollow bolt, as represented in the detached view, Fig. 6, or they may be elongated, as shown in Fig. 2, and thus made to unite a series of hollow stay-bolts lying in the same plane. The upper faces of these distributers, by preference, are left without perforations, while the lower inclined faces are provided with numerous minute perforations, through which the air is forced downward among the rising products of combustion, for causing it to mingle therewith, and thus cause their ignition and combustion.

The outer ends of the hollow stay-bolts are extended beyond the outer shell A sufficiently far to adapt them to be connected with supply-tubes, made either in the elongated form shown at C in the sectional view, Fig. 4, for supplying a series of the hollow stay-bolts with air, or in the form of a separate short tube, $C^1$, and nozzle $C^2$, as in Fig. 5, with the nozzle $C^2$ only, as in Fig. 6, or with the extended end covered and an opening formed upon the front, as at $C^3$, Figs. 5 and 7, as may be dictated by the requirements of the furnace to be supplied with air.

Valves, as at $d$, Figs. 4, 5, and 6, may be employed for controlling the admission of air.

The form of the distributing-pipes $a'$ and the arrangement of the perforations therein may be varied; but the form and arrangement described, it is believed, will be found most efficient in practice.

Adjacent to the front wall, or what would be the rear wall in a locomotive-furnace, is arranged a distributer, E, similar to that described in Letters Patent granted to me November 6, 1877, with its pendent wings extended, somewhat contracted in form, or connected by pipes $E^1$ with a vertical duct and distributer, F, made by preference in the curved or semi-cylindrical form shown in Fig. 11, provided with flanges, through which it may be secured to the wall of the fire-pot, as shown; or this duct may be provided with a rear wall independent of the wall of the fire-pot, and thus made removable, complete in itself, if preferred. The upper end of this chamber rests just under the door-opening, and may form an inclined extension of the dead-plate or coal-chute, as shown, and is provided with minute perforations for the escape of air.

The duct and distributer F has its curved outer wall or face provided with numerous perforations for the escape of air, which may increase in size and frequency, either or both, as they recede from the supply-duct or approach the more intensely-heated portions of the fire-pot, thereby retaining and more thoroughly heating the air until it reaches those parts where it is most required, not only for promoting combustion, but for the protection of the distributing-duct itself from the injury from the fire. This arrangement of the perforations may be employed to advantage in all the air-distributers herein described.

The duct F, by preference, extends downward through the fire-grate into the ash-pit, where it may be turned forward and through the shell A, and provided with a valve, $F^1$, for controlling the admission of air as required. This is the preferred arrangement; but in some cases it may be desirable to provide it with a duct penetrating the water-leg above the grate; in others it may be sufficient to allow its open lower end to terminate in the ash-pit, and take its supply of air therefrom.

The forward portion of the grate-surface is shown as consisting of a wide perforated bar or plate, G, cut away to permit the insertion or passage of the duct F, as shown. Aside from this the grate may be constructed in any usual form.

By this arrangement of the distributers E and F, and their connecting distributing-pipes $E^1$ $E^1$, air is admitted both from above and from below the fire, air being admitted to the distributer E through a duct, $E^2$, as described in my former patent referred to. If desired, also, supply-pipes $e$ may penetrate the front water-leg, connecting with the pendent wings of said distributer, for giving an additional supply of air thereto.

For preventing the open end of the duct E from receiving coal or other matter which would obstruct the action of the distributers, I apply a hood or open frame covered with wire-gauze, (shown at H in Figs. 8 and 9,) covering the open outer end of the duct, and sufficiently enlarged to not interfere with or prevent the duct from receiving the requisite supply of air. This hood or protector H may be hinged at one side and caught by a hasp, $h$, at the other, in such manner that the hood can be swung open like a door for giving access to the duct $E^2$. It may sometimes be found desirable to shut off the supply of air to this duct, and by thus hinging the door it may be swung open, and a close-fitting cover, provided in practice for the purpose, may be applied to the open end of said duct, thus shutting off the supply of air.

As a sufficient amount of air is always admitted when the fire-door is open for replenishing the fire, the supply of air through the duct $E^2$ is not needed when said door is open, and I have therefore shown in Fig. 12 a modification in the form of the protector, consisting of a valve or door, $H^1$, pivoted in the outer end of the duct and opening inward, operated by a projection on the door I, the valve dropping and closing by its own gravity when the door is opened for feeding the fire.

In the figure named the door is shown provided with a flanged opening or neck at $E^3$, fitting within the open end of duct $E^2$, for operating the valve and admitting the supply of air; but a simple horn or projection attached to the door will be sufficient to operate the valve.

The door I is, by preference, made in the hollow hemispherical form shown in Fig. 14, projecting inward from its flanges overlapping the door-frame, for adapting it to heat the air coming in contact with it. The air thus heated may pass up into the duct $E^2$, as indicated by the arrow 1, Fig. 1, or it may pass directly through perforations in the door into the fire-pot, as indicated by the arrows, Figs. 14 and 16.

Figure 15:
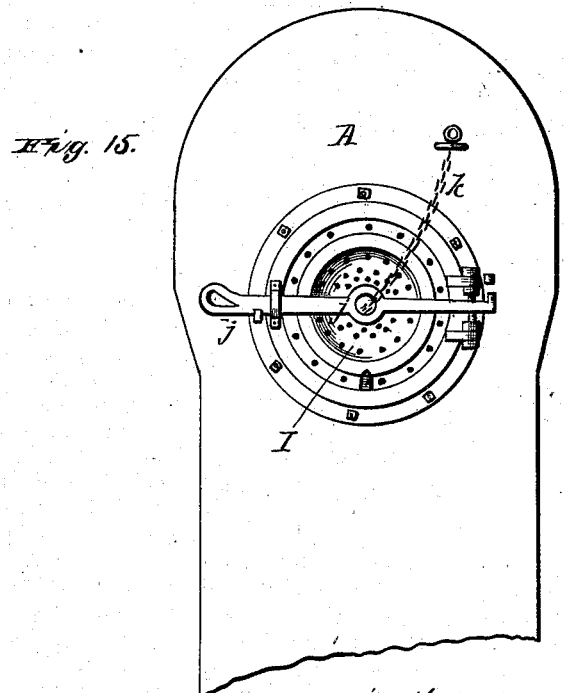
Figure 16:
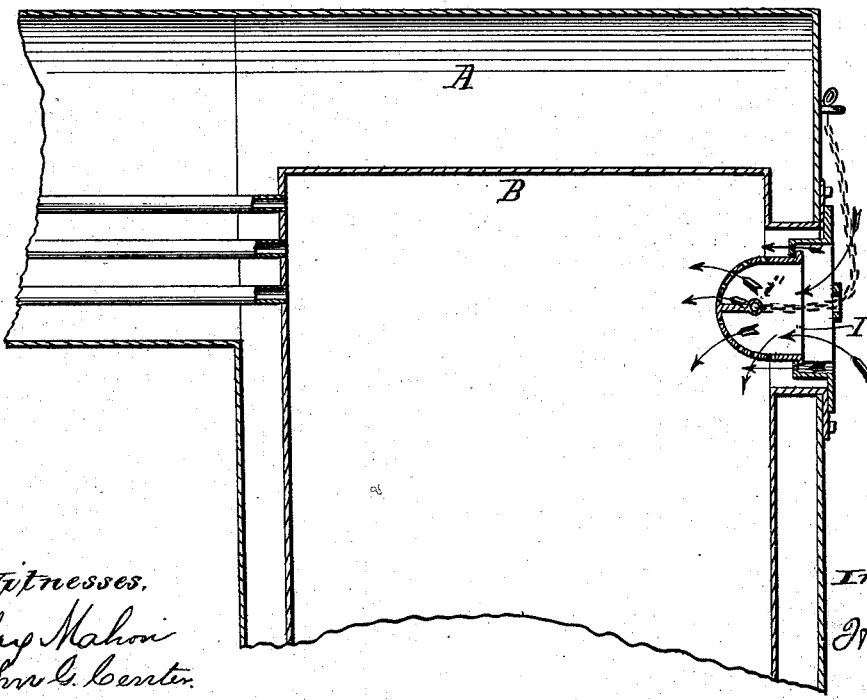

For the purpose of extending this heating-surface of the door farther into the fire-pot, and still permit the door to open and close without obstruction therefrom, the open outer end of the hemispherical portion can be extended in cylindrical form, made separate from the annular frame of the door proper, and adapted to slide in and out on ways thereon, as shown in Figs. 15 and 16.

A chain, $k$, extends from a central pin or eye at $i'$ through a perforation in the hasp $j$ of the door, and by drawing outward and upward on said chain the cylinder is drawn outward on its ways, the hasp raised, and the door opened without obstruction. When the door is closed the cylinder will be thrown inward again by the jar and the suction of the draft without attention from the fireman.

The ways on which the cylinder moves, or the cylinder itself, may be provided with friction-rollers running on said ways for obviating friction.

By this arrangement the air-heating surface of the door can be considerably increased, and said heating-surface may be still further increased by providing the inner face of the hemisphere with numerous spurs or points, $i^2$, intermediate between the air-passages, as shown in Figs. 13 and 14.

Parts of the furnace not particularly described may be constructed in any usual or preferred way, and in the parts described changes may be made without departing from my invention.

Thus, instead of hollow stay-bolts, tubes independent of the stay-bolts may be employed, and this would, in fact, be the necessary construction in furnaces not surrounded by a water-jacket.

The form and arrangement of the supply-ducts and of the distributing pipes or chambers may be varied; but an essential element of my invention is, that the distributing pipes or chambers shall project within the fire-pot in such manner as to avoid chilling the steam-generating surfaces, and in such manner, also, that the air therein shall become so heated as to adapt it to readily mingle with and promote combustion of the rising gases, cinders, &c., before it is allowed to escape from the distributing-chambers; and, further, that it shall then be so controlled in its escape as to reach in largest quantities those points in the fire-pot where its presence is most required, both for the promotion of combustion and for the protection of the air-distributing pipes or chambers.

It will be apparent that the distributers $a'$, E, and F may be applied and used separately; but, where used together, the currents or jets of heated air, coming in, as they will, from different directions and meeting, will produce eddies in the rising products of combustion, and thus cause a more thorough mingling with and combustion of the same.

Having now described my improvements, what I claim as new, and desire to secure by Letters Patent, is—

1. The air duct and distributer F, arranged within the fire-pot, and having its supply end extended below the grate-surface, and its upper end perforated, as described.

2. The combination, with the fire-box of a furnace, of the air-distributer F, perforated at its upper end to admit air to the fire-pot, and forming a perforated extension of the inclined dead-plate or chute, over which the coal is fed to the fire, as described.

3. The distributer E, connected by pendent arms or pipes $E^1$ with a duct, F, receiving air from a point below the grate-surface, as described.

4. The communicating air-distributers E and F, arranged substantially as described, in combination with independent supply-ducts, substantially as and for the purpose set forth.

5. The combination, in a furnace, of the air-distributing chamber F and the side distributing pipes or chambers $a'$, having separate supply pipes or ducts, substantially as described.

6. The combination, in the fire-box of a furnace, of the air-distributers E, F, and $a'$, arranged and operating substantially as described.

7. In a boiler-furnace, the duct $E^2$ for supplying air to the distributer E, provided with the hinged shield or hood H, for preventing the admission of obstructing matter while permitting the admission of air, as described.

8. In a furnace, the door I, provided with the open hemispherical portion projected within the fire-pot, and forming the enlarged air-heating surface, in combination with the air-duct $E^2$, as described.

9. The open hemispherical portion of the door, elongated as described, and adapted to move in and out on ways in the door-frame when the latter is closed and opened, substantially as described.

10. The combination, with the door having the sliding hemispherical central portion $I'$, of the chain $i$ and hasp $j$, arranged and operating substantially as described.

H. F. HAYDEN.

Witnesses:
JOHN G. CENTER,
J. W. HAMILTON JOHNSON.